US 9,542,176 B2

(12) United States Patent
Bird et al.

(10) Patent No.: US 9,542,176 B2
(45) Date of Patent: Jan. 10, 2017

(54) PREDICTING SOFTWARE BUILD ERRORS

(75) Inventors: Christian Bird, Seattle, WA (US); Thomas Zimmermann, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 13/589,180

(22) Filed: Aug. 20, 2012

(65) Prior Publication Data

US 2014/0053135 A1    Feb. 20, 2014

(51) Int. Cl.
G06F 11/08 (2006.01)
G06F 9/44 (2006.01)
G06F 11/00 (2006.01)

(52) U.S. Cl.
CPC .............. G06F 8/71 (2013.01); G06F 11/008 (2013.01)

(58) Field of Classification Search
CPC ................ G06F 7/78; G06F 8/00–8/78; G06F 9/44–9/455; G06F 11/36
USPC ................................................. 717/100–178
See application file for complete search history.

(56) References Cited

U.S. PATENT DOCUMENTS

| | | | | |
|---|---|---|---|---|
| 6,149,318 | A * | 11/2000 | Chase | G06F 8/437 714/E11.209 |
| 7,506,312 | B1 * | 3/2009 | Girolami-Rose | G06F 8/71 717/101 |
| 2003/0131284 | A1 * | 7/2003 | Flanagan | G06F 8/75 714/38.1 |
| 2003/0131285 | A1 * | 7/2003 | Beardsley | G06F 11/3664 714/38.14 |
| 2004/0060044 | A1 * | 3/2004 | Das | G06F 8/65 717/171 |
| 2007/0006041 | A1 * | 1/2007 | Brunswig | G06F 11/3688 714/38.14 |
| 2007/0061191 | A1 * | 3/2007 | Mehrotra | G06Q 10/06 705/7.36 |
| 2008/0104573 | A1 | 5/2008 | Singla et al. | |
| 2008/0120598 | A1 | 5/2008 | Imeshev | |
| 2009/0089755 | A1 * | 4/2009 | Johnson | G06F 11/3688 717/124 |

(Continued)

OTHER PUBLICATIONS

Ambros et al., An Extensive COmparison of Bug Prediction Approaches, 2010.*

(Continued)

*Primary Examiner* — Wei Zhen
*Assistant Examiner* — Zhan Chen
(74) *Attorney, Agent, or Firm* — Alin Corie; Sandy Swain; Micky Minhas

(57) ABSTRACT

Systems and methods for predicting a software build error are described herein. In one example, a method includes detecting a plurality of changes in software. The method also includes identifying a plurality of change lists, wherein a change list is identified for each of the plurality of changes in the software. Additionally, the method includes identifying a characteristic for each change list in the plurality of change lists. Furthermore, the method includes calculating a plurality of probabilities based at least in part on the characteristic of each of the plurality of change lists, wherein each of the probabilities indicates the likelihood of one of the plurality of change lists creating the software build error. The method also includes reporting the plurality of probabilities of the software build error.

18 Claims, 6 Drawing Sheets

(56) References Cited

U.S. PATENT DOCUMENTS

| | | | |
|---|---|---|---|
| 2010/0037035 A1* | 2/2010 | Archer | G06F 9/54 712/28 |
| 2010/0058294 A1 | 3/2010 | Best et al. | |
| 2010/0153785 A1* | 6/2010 | Keromytis et al. | 714/38 |
| 2010/0191690 A1 | 7/2010 | Bitonti et al. | |
| 2011/0022551 A1* | 1/2011 | Dixon | 706/12 |
| 2011/0041120 A1* | 2/2011 | Nagappan | G06F 11/3616 717/126 |
| 2011/0067005 A1* | 3/2011 | Bassin | G06F 11/008 717/127 |
| 2012/0167053 A1* | 6/2012 | Marum et al. | 717/125 |
| 2013/0311968 A1* | 11/2013 | Sharma | 717/101 |

OTHER PUBLICATIONS

Zimmermann, Predicting Bugs from History, 2008.*

D'Ambros et al., An Extensive Comparison of Bug Prediction Approaches, 2010.*

Zimmermann et al., Predicting Bugs from History, 2008.*

Li, Predicting field problems using metrics based models: a survey of current research, 2005.*

Connor, et al., "Predicting Software Build Failure Using Source Code Metrics", Retrieved at <<http://esjournals.org/journaloftechnology/archive/vol1no5/vol1no5_1.pdf>> In the Proceedings of International Journal of Information and Communication Technology Research, Sep. 2011, pp. 177-188.

Wolf, et al., "Predicting Build Failures using Social Network Analysis on Developer Communication", Retrieved at <<http://ieeexplore.ieee.org/stamp/stamp.jsp?tp=&arnumber=5070503>> Proceedings: IEEE 31st International Conference on Software Engineering, 2009, May 16, 2009, pp. 1-11.

Mockus, et al., "Predicting Risk of Software Changes", Retrieved at <<http://citeseerx.ist.psu.edu/viewdoc/download;jsessionid=7D53CC8805C3B619950DB78A86D3C7A7?doi=10.1.1.103.161&rep=rep1&type=pdf>> In the proceedings of Bell Labs Technical Journal, Jun. 2000, pp. 169-180.

Brun, et al., "Predicting Development Trajectories to Prevent Collaboration Conflicts", Retrieved at <<http://www.cs.washington.edu/homes/mernst/pubs/speculate-predict-fcsd2012.pdf>> In the proceedings of 2012 ACM Conference on Computer Supported Cooperative Work, Feb. 11, 2012, pp. 3.

Hassan, et al., "Using Decision Trees to Predict the Certification Result of a Build", Retrieved at <<http://ieeexplore.ieee.org/stamp/stamp.jsp?tp=&arnumber=4019574>> Proceedings: 21st IEEE International Conference on Automated Software Engineering, Sep. 18, 2006, pp. 189-198.

Kwan, et al., "Does Socio-Technical Congruence Have an Effect on Software Build Success? A Study of Coordination in a Software Project", Retrieved at <<http://ieeexplore.ieee.org/stamp/stamp.jsp?tp=&arnumber=5740929>> Proceedings: IEEE Transactions on Software Engineering, Mar. 18, 2011, pp. 307-324.

Zeller, Andreas, "Yesterday, my program worked. Today It Does not. Why?", Retrieved at <<http://citeseerx.ist.psu.edu/viewdoc/download;jsessionid=A731D9B061B66A553A776DD2C65B5946?doi=10.1.1.17.8764&rep=rep1&type=pdf>> Proceedings: ESEC/FSE-7 Proceedings of the 7th European software engineering conference held jointly with the 7th ACM SIGSOFT international symposium on Foundations of software engineering, Sep. 1999, pp. 253-267.

Kim, et al., "Classifying Software Changes: Clean or Buggy?", Retrieved at <<http://ieeexplore.ieee.org/stamp/stamp.jsp?tp=&arnumber=4408585&userType=inst>> Proceedings: IEEE Transactions on Software Engineering, Dec. 17, 2007, pp. 181-196.

* cited by examiner

PREDICTING SOFTWARE BUILD ERRORS

BACKGROUND

Software development can involve developing software code that is to be translated into machine executable code. The translation of software code written by developers into machine executable code can be referred to as a software build. During software development, errors encountered during the software build can increase the amount of time to develop software. For example, some organizations develop software with teams of developers. In some instances, one team of developers may wait to build a portion of a software application until a second team has built a separate portion of the software application. If the second team of developers encounters a software build error, the first team of developers may be delayed in building a portion of the software application. Therefore, minimizing software build errors can prevent a delay in the software development process.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for predicting software build errors. The method includes detecting a plurality of changes in software. The method also includes identifying a plurality of change lists, wherein a change list is identified for each of the plurality of changes in the software. In addition, the method includes identifying a characteristic for each change list in the plurality of change lists. Furthermore, the method includes calculating a plurality of probabilities based at least in part on the characteristic of each of the plurality of change lists, wherein each of the probabilities indicates the likelihood of one of the plurality of change lists creating the software build error. The method also includes reporting the plurality of probabilities of the software build error.

Another embodiment is a system for predicting software build errors. The system includes a display device to display a plurality of probabilities, a processor to execute processor executable code, and a storage device that stores processor executable code. The system detects a plurality of changes in software. The system also identifies a plurality of change lists, wherein a change list is identified for each of the plurality of changes in the software. In addition, the system identifies a characteristic for each change list in the plurality of change lists. Furthermore, the system identifies a logistic regression. The system also uses the logistic regression to calculate the plurality of probabilities based at least in part on the characteristic of each of the plurality of change lists, wherein each of the probabilities indicates the likelihood of one of the plurality of change lists creating the software build error. Additionally, the system reports the plurality of probabilities of the software build error.

Another embodiment provides one or more tangible computer-readable storage media comprising a plurality of instructions. The instructions cause a processor to detect a plurality of changes in software and identify a plurality of change lists, wherein a change list is identified for each of the plurality of changes in the software. The instructions also cause a processor to identify a characteristic for each change list in the plurality of change lists. Furthermore, the instructions cause a processor to calculate a plurality of probabilities based at least in part on the characteristic of each of the plurality of change lists, wherein each of the probabilities indicates the likelihood of one of the plurality of change lists creating the software build error. The instructions also cause the processor to report the plurality of probabilities of the software build error.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Various methods for predicting software build errors have been developed to minimize delays associated with software build errors. Some methods include collecting information regarding certain aspects of the software code such as the number of lines of software code changed since the last software build. These methods may attempt to determine the likelihood of a successful software build based on the collected information. However, many of these methods focus on information derived from the software code rather than the process of building software and the actual changes that have been made to the software. Other methods include identifying a set of variables that may identify a software build error. However, many of these methods rely on decision trees that use a fixed set of variables to identify when a software build may fail.

The techniques described herein can predict a software build error based on any suitable number of probabilities of a software build error. In some embodiments, the techniques described herein can identify a series of changes since the last software build and calculate a probability that each change may create a software build error. A software build can refer to the state of building software, which includes compiling software (also referred to herein as software code) into machine executable files and linking the machine executable files to form an application. A software build error can include an error in the software code that prevents the software code from being compiled into an executable file or prevents the software code from being linked. A software build error may prevent the software code from being translated into machine executable code, which may prevent the software code from being incorporated in an application.

Figure 1:
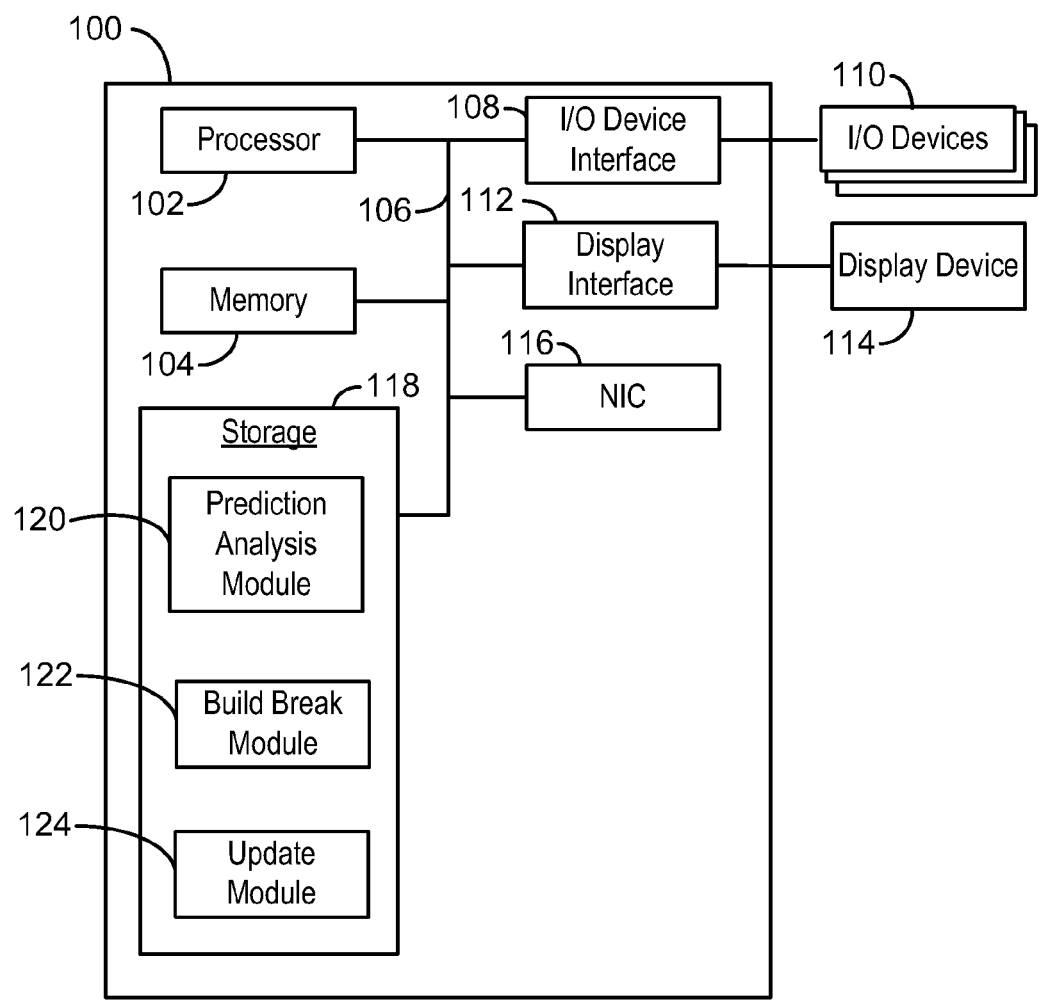
FIG. 1 is a block diagram of an example of a computing system that predicts software build errors.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that predicts software build errors. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to predict software build errors.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted). The network (not depicted) may be a wide area network (WAN), local area network (LAN), or the Internet, among others.

The storage 118 can include a hard drive, an optical drive, a USB flash drive, an array of drives, or any combinations thereof. The storage 118 may include a prediction analysis module 120, a build break module 122, and an update module 124. The prediction analysis module 120 can detect any number of changes to software code and predict the likelihood the software code contains a software build error. The prediction analysis module 120 can predict the likelihood of software code containing a software build error by calculating the probability that each change to the software code may cause a software build error. The build break module 122 can build the software and detect a software build error. If the build break module 122 detects a software build error, the build break module 122 may also detect the change to the software code that caused a software build error. The build break module 122 can send the changes that cause software build errors to the update module 124. The update module 124 can store historical information for software code changes and corresponding build errors. The update module 124 can provide the historical information to the prediction analysis module 120, which allows the prediction analysis module 120 to calculate accurate predictions of software build errors.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional memory devices, additional network interfaces, etc.). For example, the computing system 100 may include a reporting module that can report software build information to a user, an application, or another hardware device, among others. Furthermore, any of the functionalities of the prediction analysis module 120, build break module 122, or update module 124 may be partially, or entirely, implemented in hardware and/or in the processor 102. For example, the functionality may be implemented with an application specific integrated circuit, in logic implemented in the processor 102, or in any other device.

Figure 2:
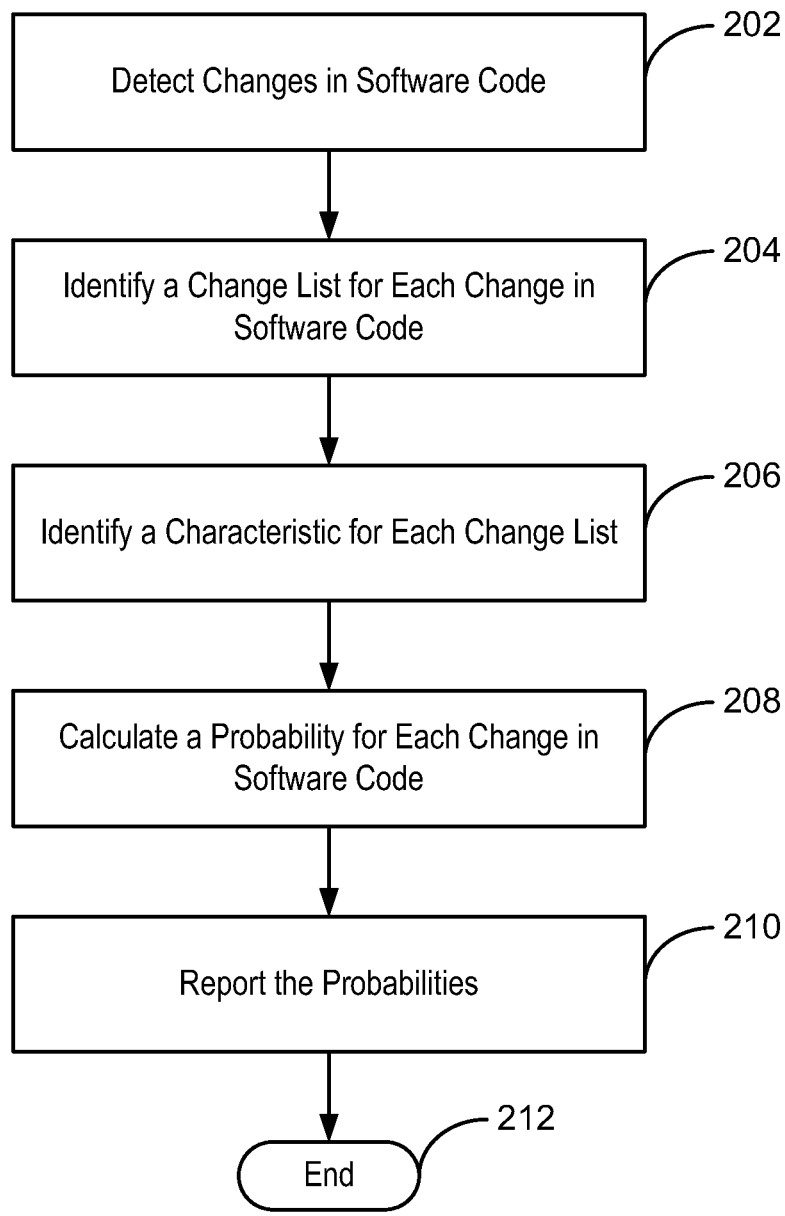
FIG. 2 is a process flow diagram illustrating an example of a method for predicting software build errors.

FIG. 2 is a process flow diagram illustrating an example of a method for predicting software build errors. The method 200 can be implemented with a computing system, such as the computing system 100 of FIG. 1. The computing system 100 may also include a prediction analysis module 120 that can predict software build errors based on changes to software code and historical information of previous software code changes and previous software build results.

At block 202, the prediction analysis module 120 detects changes in software code. In one embodiment, the prediction analysis module 120 can detect the changes to the software code by comparing the software code to a previous version of the software code. For example, the prediction analysis module 120 may detect changes in two different versions of software code by identifying differences in the software code. In other embodiments, the prediction analysis module 120 may detect changes in software code by identifying indicators in the software code that correspond with the changes to the software code. For example, the prediction analysis module 120 may detect changes in software code based on comments included in the software code that correspond with changes in the software code.

At block 204, the prediction analysis module 120 identifies a change list for each change to the software code. In some embodiments, the prediction analysis module 120 may include multiple changes in each change list. For example, a developer may change several lines of software code, which the prediction analysis module 120 can include in one change list. In other embodiments, the prediction analysis module 120 may identify a change list for each developer or each work session. For example, the prediction analysis module 120 may identify the changes made to software code from a particular developer and store the changes in a change list. In other examples, the prediction analysis module 120 may identify each work session that includes changes to the software code and identify a change list for each work day for each developer.

At block 206, the prediction analysis module 120 identifies a characteristic for each change list. A characteristic of the change list can include any information associated with a change in software code. In some embodiments, the characteristic may include information derived from the software code. For example, a characteristic of the change list may include the number of modified software code files or the number of modified lines of software code, among others. In some embodiments, the characteristic may also include information derived from factors related to the change in software code. For example, a characteristic of the change list may include a determination of the developer that made the change to the software code, the projects affected by the change, a determination of the computing system the developer used to compile the software code, the number or names of individuals that reviewed the change to the software code (also referred to herein as a review determination), the time the change was submitted (also referred to herein as a time determination), complexity metrics related to the change in the software code, and dependencies based on the changed software code, among others. The complexity metrics can include the number of characters in a line of software code, the number of nested loops surrounding the line of software code, or any other factors that indicate the complexity of software code.

Additional examples of characteristics of the change list may include any activity performed by other developers on source code files, or lines of source code files that have been modified or are related to a given change list (referred to herein as an activity determination). A characteristic of a change list may also include a representation of the changes made by developers. For example, the changes made by developers may include source code fragments that have been introduced, identifiers that have been referenced, or any other descriptions of changes made to source code (referred to herein as a change determination). Additional characteristics may also include the state of the source code repository that a developer's computing system was synced to when the software was built on the developer's computing system (also referred to herein as a developer build determination), the tests that were executed on the developer's computing system, and the projects that were included as part of the software build. The prediction analysis module 120 can provide more accurate predictions by considering any number of characteristics that correspond with a change list.

At block 208, the prediction analysis module 120 calculates a probability for each change in the software code. In some embodiments, the probability for each change can represent the likelihood the change in the software code may result in a software build error. The probability can be calculated using regression, such as logistic regression. For example, the prediction analysis module 120 can generate a coefficient for each characteristic related to a change list. The prediction analysis module 120 can determine the coefficients based on historical data. For example, historical data may indicate that a particular software developer has a 20% probability of causing a software build error. In this example, the prediction analysis module may assign a 20% value as a coefficient to the characteristic related to the software developer.

In some embodiments, the prediction analysis module 120 can combine the probabilities of a software build error. For example, the prediction analysis module 120 may calculate the individual probabilities (P1, P2, . . . PN) for each change list to cause a software build error. The prediction analysis module 120 can combine the probabilities with the Equation 1.

$$1-(1-P1)(1-P2)\ldots(1-PN)=P(\text{Error}) \qquad \text{Eq}(1)$$

In Equation 1, P1 through PN represent probabilities that a change list may cause a software build error. The term P(Error) represents the likelihood that a software build error may occur based on N changes to the software code.

In some embodiments the prediction analysis module 120 may aggregate the characteristics of the individual change lists and calculate a combined probability of a software build error for a plurality of change lists. For example, the prediction analysis module 120 may detect the number of change lists in a software build. The prediction analysis module 120 may also detect any suitable number of aggregate values associated with the change lists. For example, three change lists may indicate that 100, 150, and 200 lines of source code have been changed. The number of changed lines of code may be aggregated by summation into a combined number of changed lines of code, or 450 changed lines of code in the previous example. The software build may be assigned a higher risk of causing a software build error if previous software builds with more than 400 changed lines of source code resulted in software build errors In other examples, the prediction analysis module 120 may aggregate the characteristics of change lists by detecting the aggregate maximum probability of a software build error, the aggregate minimum probability of a software build error, the aggregate average probability of a software build error, the aggregate median probability of a software build error, the summation of probabilities of a software build error, aggregated percentiles of a software build error, or the standard deviation of a probability of a software build error, among others.

At block 210, the prediction analysis module 120 reports the probabilities that each change in software code may cause a software build error. In some embodiments, the prediction analysis module 120 can report the probabilities for software build errors to users, applications, or other hardware devices, among others. For example, the prediction analysis module 120 may calculate the probability that a change to the software code may result in a software build error is 20%. In this example, the prediction analysis module 120 may report to a user the 20% prediction of the likelihood the change may cause a software build error. The process ends at block 212.

The process flow diagram of FIG. 2 is not intended to indicate that the steps of the method 200 are to be executed in any particular order, or that all of the steps of the method 200 are to be included in every case. In some examples, the changes in software code may be detected incrementally. For example, the prediction analysis module 120 may generate a new change list for each change to software code and recalculate the probabilities of a software build error. In other examples, the characteristics may vary as additional changes to software code are detected. For example, the prediction analysis module 120 may detect various characteristics, such as complexity metrics, or a change determination, among others, for an integrated development environment. The prediction analysis module 120 may then detect additional characteristics after a developer has committed changes to software code. Further, any number of additional steps may be included within the method 200, depending on the specific application. In some embodiments, the prediction analysis module 120 may send the change lists to a build break module 122, which can determine if a change to the software code causes a software build error. The build break module 122 is discussed below in greater detail in relation to FIG. 4. In other embodiments, the prediction analysis module 120 may send the change lists to an update module 124. The update module 124 can update historical data corresponding to change lists and software build errors. The update module 124 is discussed below in greater detail in relation to FIG. 5.

Figure 3:
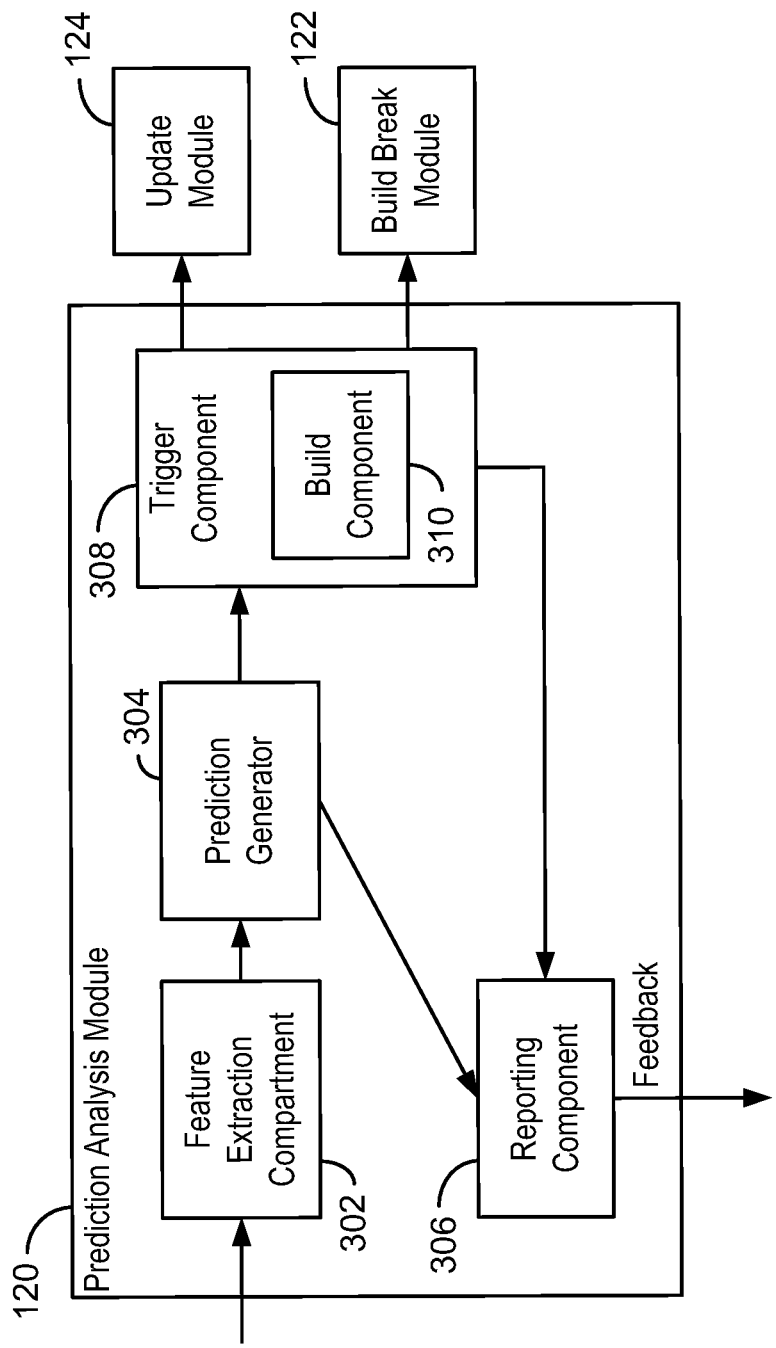
FIG. 3 is a block diagram illustrating an example of a prediction analysis module used to predict software build errors.

FIG. 3 is a block diagram illustrating an example of a prediction analysis module used to predict software build errors. The prediction analysis module 120 can be implemented in a computing system, such as the computing system 100 of FIG. 1. In some embodiments, the prediction analysis module 120 can include a feature extraction component 302, a prediction generator 304, a trigger component 308, and a reporting component 306. The components of the prediction analysis module 120 can identify and analyze the likelihood of software build errors.

In some embodiments, the prediction analysis module 120 can accept any suitable number of change lists as input. As discussed above, a change list can include any appropriate number of changes to software code. The prediction analysis module 120 can send the change lists to a feature extraction component 302. The feature extraction component 302 can determine any appropriate number of characteristics associated with a change in software code. For example, the feature extraction component 302 may identify characteristics associated with each change list. In some examples, the feature extraction component 302 can identify characteristics such as the number of modified software code files, the number of modified lines of software code, the developer that made the change to the software code, the projects affected by the change, the computing system the developer used to compile the software code, the number of individuals that reviewed the change to the software code, the time the change was submitted, complexity metrics related to the change in the software code, and dependencies based on the changed software code, among others. The feature extraction component 302 can send the change list and the corresponding characteristics to a prediction generator 304.

The prediction generator 304 can calculate probabilities for software build errors based on the characteristics of the change lists. As discussed above in relation to FIG. 2, the probabilities for software build errors can be calculated using a type of regression or using machine learning models including but not limited to support vector machines, Naïve Bayes, or decision trees, among others. In some embodiments, the probabilities for software build errors are calculated based on linear regression or on logistic regression. In other embodiments, the probabilities can be combined to calculate a likelihood of a software build error based on the combined probabilities for each change list causing a software build error. In some embodiments, the prediction generator 304 can send the probabilities of a software build error to a reporting component 306 and a trigger component 308.

The reporting component 306 can provide feedback to a user, an application, or a hardware device using any suitable number of methods. In some embodiments, the feedback can include the probability that a change list may cause a software build error. The reporting component 306 may provide feedback through a message sent to the display device, a dialog box generated in IDE, an email notification, or a newsfeed, among others.

The trigger component 308 can initiate or request additional actions based on the probability of a software build error. For example, the trigger component 308 may provide feedback to developers through the reporting component 306. The feedback may request additional review of software code that has a high probability of creating a software build error. In some examples, the feedback can identify particular characteristics of a change list and the corresponding probability of creating a software build error. The feedback may recommend additional review of a particular change list, to build additional projects before submitting the changes to source code, or to run additional tests prior to submission, among others. In some embodiments, the trigger component 308 can also request additional check-in or quality logic gates during the build process. For example, the trigger component 308 may include a build component 310 that compiles and links software code to form machine executable applications. The trigger component 308 may instruct the build component 310 to include additional quality logic gates, which may prevent a software build error. The additional quality logic gates may also assist in determining the cause of a software build error.

In some embodiments, the trigger component 308 may also provide instructions to the build component 310 that control a software build. For example, the trigger component 308 may instruct the build component 310 to build software by grouping change lists together that share a low-risk of creating a software build error. The trigger component 308 can identify change lists that have a low-risk of causing a software build error based on probabilities that each change list may cause a software build error. In some embodiments, the trigger component 308 may also instruct the build component 310 to build high-risk change lists prior to building low-risk change lists. The trigger component 308 can also identify change lists that have a high-risk of causing a software build error based on probabilities that indicate a change list is likely to cause a software build error. For example, the trigger component 308 may send high-risk change lists to multiple computing systems, which can allow the high-risk change sets to be built in parallel. The trigger component 308 may provide faster feedback to a reporting component 306 regarding high-risk change lists when the high-risk change lists are built in parallel.

In some embodiments, the trigger component 308 can also send the change list to an update module 312 if the build component 310 does not return a software build error. The update module 122 can store historical data regarding change lists and the success or failure of software builds based on the change lists. In some embodiments, the trigger component 308 may receive a single change list indicating that a single change list incorporates the changes made to software code. The trigger component 308 may send the results of the build to an update module 122 if the build succeeds or fails. The update module 122 can then update the historical data to reflect whether the change list caused a software build error. In other embodiments, the trigger component 308 can send the change list to a build break module 122 when the build component 310 returns a software build error. The build break module 122 can identify the change list that caused the software build error and provide feedback to developers. The build break module 122 is discussed in greater detail below in relation to FIG. 4.

It is to be understood that the block diagram of FIG. 3 is not intended to indicate that the prediction analysis module 120 is to include all of the components shown in FIG. 3. Rather, the prediction analysis module 120 can include fewer or additional components not illustrated in FIG. 3. For example, the prediction analysis module 120 may not include a build component 310. Rather, the functionality of the build component 310 may be implemented by a processor, or any other suitable hardware device.

Figure 4:
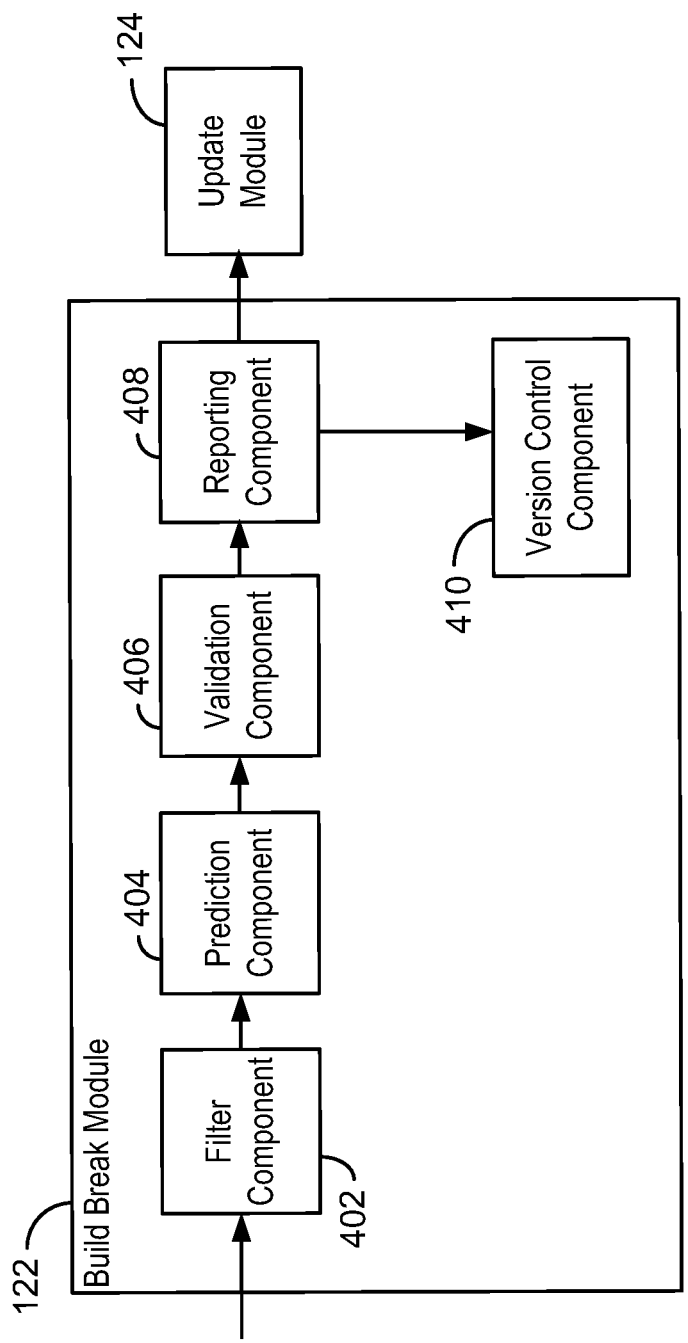
FIG. 4 is a block diagram illustrating an example of a build break module used to analyze software build errors.

FIG. 4 is a block diagram illustrating an example of a build break module used to analyze software build errors. The build break module 122 can be implemented in a computing system, such as the computing system 100 of FIG. 1. In some embodiments, the build break module 122 can include a filter component 402, a prediction component 404, a validation component 406, a reporting component 408, and a version control component 410. The components of the build break module 122 can analyze software build errors.

The build break module 122 can accept any suitable number of changes to software code and build logs produced by a build component. The build logs can include information generated during the build process. For example, the build logs may include information that indicates certain portions of the software code that did not produce a software build error. In some embodiments, the filter component 402 can exclude any changes to the software code that are known not to be responsible for the software build error. For example, the filter component 402 may identify any changes included in previous builds that did not result in a software build error. In other embodiments, the filter component 402 may perform dynamic analysis based on historical data stored in an update module 122. The filter component 402 can send a set of candidate change lists that may have caused the software build error to the prediction component 404.

The prediction component 404 can detect the likelihood that a change list caused the software build error. As discussed above in relation to FIG. 2, the probabilities for software build errors can be calculated using any suitable type of regression, such as logistic or linear regression. In some embodiments, the prediction component 404 can calculate probabilities that each change list caused a software build error.

In some embodiments, the prediction component 404 can send the change lists and the probabilities that each change list caused a software build error to a validation component 406. The validation component 406 can recreate the build with each change list. In some embodiments, the validation component 406 may first select the change lists with the highest probabilities of causing a software build error. The validation component can recreate the software build and determine if the change list causes a software build error. The validation component 406 may then select the change lists with the lower probabilities of causing a software build error. In other embodiments, the validation component 406 may use a binary search or delta debugging to determine the change lists that cause a software build error. The validation component 406 can determine the change lists that cause software build errors and send the change lists to the reporting component 408. The reporting component 408 can send the change lists and the software build errors to a display device, a dialog box generated in IDE, an email notification, or a newsfeed, among others.

The reporting component 408 can also send the change lists and the software build errors to a version control component 410. The version control component 410 can remove any modifications to the software code that results in a software build error. For example, the version control component 410 can remove any changes to software code that prevents the software code from being compiled and linked into a machine executable application. The reporting component 408 can also send the change lists and the software build errors to the update module 122, which is discussed below in greater detail in relation to FIG. 5.

It is to be understood that the block diagram of FIG. 4 is not intended to indicate that the build break module 122 is to include all of the components shown in FIG. 4. Rather, the build break module 122 can include fewer or additional components not illustrated in FIG. 4. For example, the build break module 122 may not include a validation component 406. Rather, the functionality of the validation component 406 may be implemented by a processor, or any other suitable hardware device.

Figure 5:
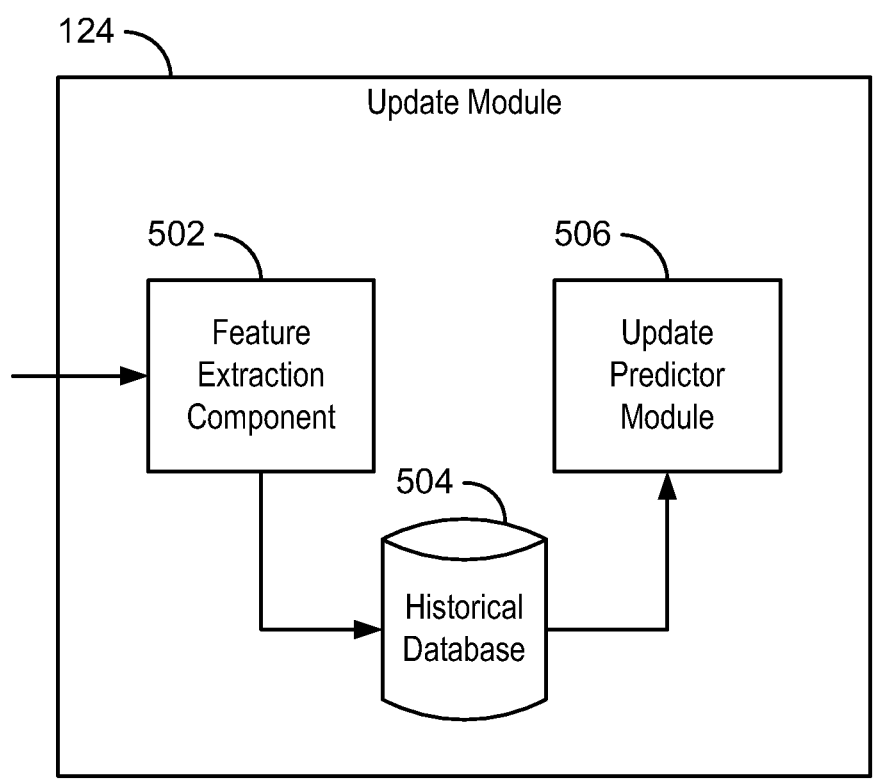
FIG. 5 is a block diagram illustrating an example of an update module used to update the prediction analysis module.

FIG. 5 is a block diagram illustrating an example of an update module used to update the prediction analysis module. The update module 124 can be implemented in a computing system, such as the computing system 100 of FIG. 1. In some embodiments, the update module 124 can include a feature extraction component 502, a historical database 504, and an update predictor module 506.

In some embodiments, the update module 124 can detect change lists and build outcomes associated with the change lists. The update module 124 can then use a feature extraction component 502 to extract characteristics related to the change lists. For example, the feature extraction component 502 may extract characteristics such as the developer that made the change to the software code, the projects affected by the change, the computing system the developer used to compile the software code, the number of individuals that reviewed the change to the software code, or the time the change was submitted, among others.

The feature extraction component 502 can send the change lists, build outcomes, and characteristics to a historical database 504. The historical database 504 can store change lists and characteristics of change lists in a table along with the build outcome. In some embodiments, the historical database 504 can send data to the prediction analysis module 120, which allows the prediction analysis module 120 to calculate accurate probabilities of the likelihood a change list may cause a software build error. In other embodiments, the historical database 504 can also send the change lists, the build outcomes and the characteristics of change lists to an update predictor module 506. The update predictor module 506 can train a prediction model based on historical data and send the prediction model to the prediction analysis module 120 when the prediction model has an accuracy above a threshold.

It is to be understood that the block diagram of FIG. 5 is not intended to indicate that the update module 124 is to include all of the components shown in FIG. 5. Rather, the update module 124 can include fewer or additional components not illustrated in FIG. 5. For example, the update module 124 may not include an update predictor module 506. Rather, the functionality of the update predictor module 506 may be implemented by a processor, or any other suitable hardware device.

Figure 6:
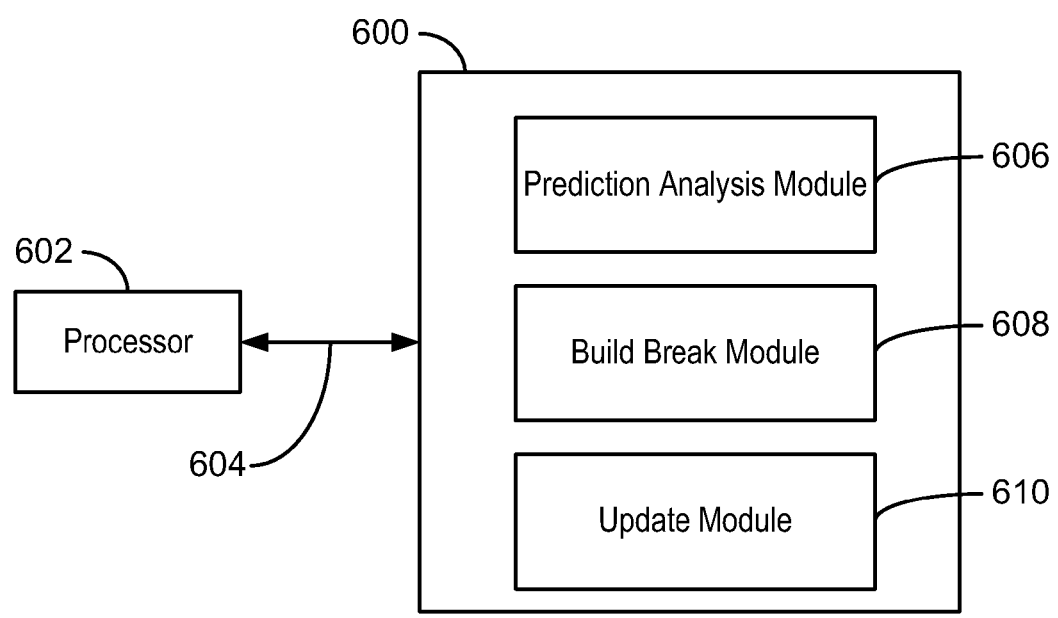
FIG. 6 is a block diagram illustrating an example of a tangible, computer-readable storage media that predicts software build errors.

FIG. 6 is a block diagram showing a tangible, computer-readable storage media 600 that predicts software build errors. The tangible, computer-readable storage media 600 may be accessed by a processor 602 over a computer bus 604. Furthermore, the tangible, computer-readable storage media 600 may include code to direct the processor 602 to perform the steps of the current method.

The various software components discussed herein may be stored on the tangible, computer-readable storage media 600, as indicated in FIG. 6. For example, the tangible computer-readable storage media 600 can include a prediction analysis module 606, a build break module 608, and an update module 610. The prediction analysis module 606 can detect any number of changes to software code and predict the likelihood the software code contains a software build error. The build break module 608 can analyze software build errors to determine the likelihood a change to software code has caused a build break. The update module 610 can store historical information for software code changes and corresponding software build errors. The update module 610 can provide the historical information to the prediction analysis module 120, which allows the prediction analysis module 120 to calculate accurate predictions regarding software build errors.

It is to be understood that any number of additional software components not shown in FIG. 6 may be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

What is claimed is:

1. A method for predicting a software build error, comprising: detecting a plurality of changes in software;
   identifying a plurality of change lists, wherein a change list is identified for each of the plurality of changes in the software;
   identifying a characteristic for each change list in the plurality of change lists, the characteristic comprising a complexity metric based in part on a number of nested loops surrounding a changed line of software code;
   calculating a plurality of probabilities based on the characteristic of each of the plurality of change lists, wherein each of the probabilities indicates the likelihood of one of the plurality of change lists creating the software build error, the software build error preventing the software from being compiled into an executable file or preventing the software from being translated into machine executable code, and wherein the plurality of probabilities are calculated based on a plurality of coefficients, each coefficient corresponding to each characteristic of each of the plurality of change lists, the coefficients determined from historical data;
   reporting the plurality of probabilities of the software build error; and removing the change that resulted in the software build error from the software.

2. The method of claim 1, comprising:
   building the software;
   detecting the software build error;
   determining a change from the plurality of changes in the software that resulted in the software build error; and
   reporting the change that resulted in the software build error.

3. The method of claim 2, comprising updating a prediction generator used for predicting the software build error based on the change that resulted in the software build error.

4. The method of claim 1, wherein calculating the plurality of probabilities comprises calculating a regression that indicates the likelihood that each of the plurality of probabilities is to result in the software build error.

5. The method of claim 1, comprising:
   identifying a plurality of high-risk change lists based on the plurality of probabilities;
   sending each of the plurality of high risk change lists to a separate computing system with instructions to build the software based on the high-risk change list; and
   detecting the high-risk change lists that cause the software build error.

6. The method of claim 1, wherein the plurality of characteristics comprise a combination of the complexity metric, a software developer determination, a computing system determination, a time determination, a review determination, an activity determination, a developer build determination, and a change determination, the developer build determination comprising a state of a source code repository to which a developer's computing system was synced during generation of the software and the complexity metric being based in part on a number of characters in a changed line of software code.

7. The method of claim 1, wherein the software build error created by one of the plurality of change lists prevents the software from being linked.

8. The method of claim 1, comprising identifying each of the change lists as a high-risk change list or a low-risk change list; and building the high-risk change lists prior to building the low-risk change lists, the building of the high-risk change lists comprising sending the high-risk change lists to multiple computing systems to enable the high-risk change lists to be built in parallel.

9. The method of claim 1, wherein the characteristic for each change list comprises a number of individuals that reviewed the change.

10. The method of claim 1, comprising aggregating the characteristics for the change lists by detecting an aggregate maximum probability from the plurality of probabilities or a summation of the plurality of probabilities.

11. The method of claim 10, comprising using a binary search or delta debugging technique to determine the change lists that cause the software build error and sending the change lists to a dialog box generated in an integrated development environment (IDE).

12. The method of claim 1, wherein each of the plurality of changes is detected based on a plurality of comments in the software.

13. A system for predicting a software build error, comprising:
 a display device to display a plurality of probabilities;
 a processor to execute processor executable code;
 a storage device that stores processor executable code, wherein the processor executable code, when executed by the processor, causes the processor to: detect a plurality of changes in software;
 identify a plurality of change lists, wherein a change list is identified for each of the plurality of changes in the software;
 identify a characteristic for each change list in the plurality of change lists the characteristic comprising a complexity metric based in part on a number of nested loops surrounding a changed line of software code;
 identify a regression;
 use the regression to calculate the plurality of probabilities based on the characteristic of each of the plurality of change lists, the plurality of change lists corresponding to the changes to the software since a previous software build, wherein each of the probabilities indicates the likelihood of one of the plurality of change lists creating the software build error, the software build error preventing the software from being compiled into an executable file or preventing the software from being translated into machine executable code, and wherein the plurality of probabilities are calculated based on a plurality of coefficients, each coefficient corresponding to each characteristic of each of the plurality of change lists, the coefficients determined from historical data;
 calculate a combined probability of the software build error by aggregating the plurality of probabilities, the combined probability corresponding to an aggregate maximum probability, an aggregate minimum probability, an aggregate average probability, or an aggregate median probability;
 report the combined probability of the software build error;
 recommend an action to reduce the combined probability of the software build error; and
 remove the change that resulted in the software build error from the software.

14. The system of claim 13, wherein the processor executable code causes the processor to:
 build the software;
 detect the software build error;
 determine a change from the plurality of changes in the software that resulted in the software build error; and
 report the change that resulted in the software build error.

15. The system of claim 14, wherein the processor executable code causes the processor to update a prediction generator used for predicting the software build error based on the change that resulted in the software build error.

16. The system of claim 13, wherein the processor executable code causes the processor to calculate a regression that indicates the likelihood that each of the plurality of probabilities is to result in the software build error.

17. The system of claim 13, wherein the processor executable code causes the processor to:
 identify a plurality of high-risk change lists based on the plurality of probabilities;
 send each of the plurality of high risk change lists to a separate computing system with instructions to build the software based on the high-risk change list; and
 detect the high-risk change lists that cause the software build error.

18. The system of claim 13, wherein the plurality of characteristics comprise any combination of the complexity metric, a software developer determination, a computing system determination, a time determination, a review determination, an activity determination, a developer build determination, and a change determination, the developer build determination comprising a state of a source code repository to which a developer's computing system was synced during generation of the software and the complexity metric being based in part on a number of characters in a changed line of software code.

* * * * *